United States Patent
Yokogawa (10) Patent No.: US 9,316,869 B2
(45) Date of Patent: Apr. 19, 2016

(54) LIQUID CRYSTAL DISPLAY DEVICE

(71) Applicant: Japan Display Inc., Minato-ku (JP)

(72) Inventor: Akira Yokogawa, Ishikawa-ken (JP)

(73) Assignee: Japan Display Inc., Minato-ku (JP)

( * ) Notice: Subject to any disclaimer, the term of this patent is extended or adjusted under 35 U.S.C. 154(b) by 304 days.

(21) Appl. No.: 13/964,329

(22) Filed: Aug. 12, 2013

(65) Prior Publication Data

US 2014/0111756 A1 Apr. 24, 2014

(30) Foreign Application Priority Data

Oct. 19, 2012 (JP) .................. 2012-232101

(51) Int. Cl.
| | |
|---|---|
| G02F 1/1339 | (2006.01) |
| G02F 1/1345 | (2006.01) |
| G02F 1/1341 | (2006.01) |
| G02F 1/01 | (2006.01) |
| G09G 3/20 | (2006.01) |
| G02F 1/161 | (2006.01) |

(52) U.S. Cl.
CPC ............ G02F 1/1339 (2013.01); G02F 1/1345 (2013.01); G02F 1/13452 (2013.01); *G02F 1/0107* (2013.01); *G02F 1/1341* (2013.01); *G02F 1/161* (2013.01); *G09G 3/2092* (2013.01); *G09G 2300/0426* (2013.01)

(58) Field of Classification Search
CPC ... G02F 1/1339; G02F 1/1341; G02F 1/0107; G02F 1/161; G02F 1/13452; G02F 1/1345; G09G 2300/0426; G09G 2300/0408; G09G 2300/3688; G09G 2310/027; G09G 3/3677; G09G 3/2092
USPC ............ 349/149, 152–155; 345/87, 204–206
See application file for complete search history.

(56) References Cited

U.S. PATENT DOCUMENTS

| | | | |
|---|---|---|---|
| 6,424,394 B1 * | 7/2002 | Morii ............................ | 349/110 |
| 8,274,635 B2 * | 9/2012 | Tsuchiya et al. ............. | 349/153 |
| 2005/0190335 A1 * | 9/2005 | Maruyama et al. .......... | 349/153 |

* cited by examiner

*Primary Examiner* — Michael Caley
*Assistant Examiner* — Angela Davison
(74) *Attorney, Agent, or Firm* — Oblon, McClelland, Maier & Neustadt, L.L.P (57) ABSTRACT

An array substrate includes a circumference wiring along with a periphery of an active area. A seal element is arranged surrounding the active area and forming a liquid crystal injecting mouth, and a seal material seals the liquid crystal injecting mouth. The circumference wiring is located in the liquid crystal injecting mouth and extends in a first direction. The circumference wiring includes a first wiring portion formed of a plurality of straight line portions, a second wiring portion in the shape of a grid formed of a plurality of straight line portions and a third wiring portion formed of a plurality of straight line portions. The respective straight line portions of the first, second and third wiring portions are connected along the first direction in the liquid crystal injecting mouth.

17 Claims, 5 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2012-232101 filed Oct. 19, 2012, the entire contents of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and PDA (personal digital assistant), a car navigation equipment, and a game machine.

A pair of substrates which constitutes a liquid crystal display panel is pasted together by seal element while a cell gap for holding a liquid crystal layer is formed. A liquid crystal injecting mouth formed in the seal element is sealed by seal material. The seal material is formed of photosensitive resin, such as ultraviolet curing type resin. For this reason, when wirings are located in the liquid crystal injecting mouth, the radiated light to cure the sealing material may not reach to the sealing material because the radiated light is shaded by the wirings. In such a case, since the sealing element contacts with the liquid crystal layer in an un-cured state, impurities contained in the sealing material may result in contamination of the liquid crystal layer. The liquid crystal layer polluted with impurities has different optical characteristic or electrical property from the liquid crystal layer which is not polluted. Accordingly, the polluted liquid crystal layer may be sighted as unevenness because of alignment turbulence. For example, near the liquid crystal injecting mouth, the liquid crystal layer may be sighted as white unevenness. For this reason, it is required that degradation of display grace be controlled.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including a circumference wiring along with a periphery of an active area which displays images; a second substrate arranged facing the first substrate; a seal element arranged surrounding the active area and forming a liquid crystal injecting mouth, the seal element attaching the first substrate and the second substrate while a cell gap is formed between the first substrate and the second substrate; a liquid crystal layer held in the cell gap surrounded with the seal element; and a seal material to seal the liquid crystal injecting mouth; wherein the circumference wiring is located in the liquid crystal injecting mouth and extends in a first direction, and includes, a first wiring portion formed of a plurality of straight line portions having a first straight line portion and a second straight line portion extending in the first direction and arranged in a second direction orthogonally crossing the first direction, a second wiring portion in the shape of a grid formed of a plurality of straight line portions having a third straight line portion extending in a third direction crossing the first and second directions and connected with the first straight line portion, and a fourth straight line portion extending in a fourth direction crossing the first and third directions and connected with the second straight line portion, and a third wiring portion formed of a plurality of straight line portions having a fifth straight line portion extending in the first direction and connected with the third straight line portion, and a sixth straight line portion extending in the first direction and connected with the fourth straight line portion, the sixth straight portion and the fifth straight portion being arranged in the second direction.

According to other embodiment, a liquid crystal display device includes: a first substrate including a circumference wiring along with a periphery of an active area which displays images; a second substrate arranged facing the first substrate; a seal element arranged surrounding the active area and forming a liquid crystal injecting mouth, the seal element attaching the first substrate and the second substrate while a cell gap is formed between the first substrate and the second substrate; a liquid crystal layer held in the cell gap surrounded with the seal element; and a seal material to seal the liquid crystal injecting mouth; wherein the circumference wiring located in the liquid crystal injecting mouth and extending in a first direction includes a first slit extending in the first direction, a second slit extending in the first direction and located on the same line as the first slit, and an oblique wiring line arranged between the first slit and the second slit obliquely crossing the first direction.

Figure 1:
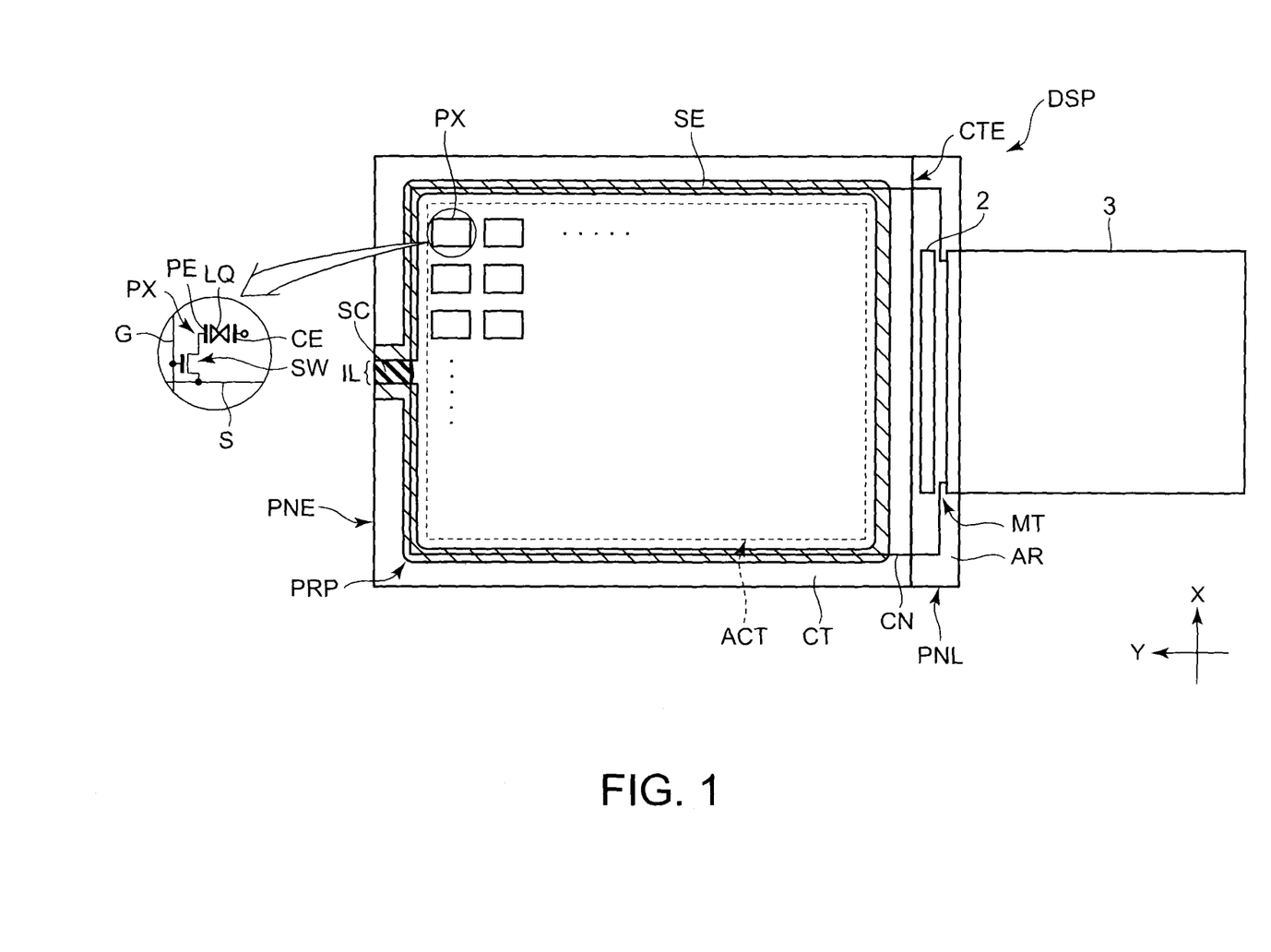
FIG. 1 is a plan view schematically showing a liquid crystal display device DSP according to one embodiment.

FIG. 1 is a plan view schematically showing a liquid crystal display device DSP according to one embodiment.

The liquid crystal display device DSP is equipped with a display panel PNL. The display panel PNL is an active-matrix type liquid crystal display panel, and equipped with an array substrate AR and a counter substrate CT, and a liquid crystal layer LQ held therebetween. The array substrate AR and the counter substrate CT are pasted together by a seal element SE while forming a predetermined cell gap between the substrates. The cell gap is formed of a pillar-shaped spacer which is formed on the array substrate AR or the counter substrate CT (not illustrated). The liquid crystal layer LQ is held on the inner side surrounded with the seal element SE in the cell gap between the array substrate AR and the counter substrate CT.

The display panel PNL is equipped with an active area ACT which displays images on the inner side surrounded with the seal element SE. The active area ACT is formed of a plurality of pixels PX in a rectangular shape by being arranged in the shape of a [m×n] matrix, for example (here, m and n are positive integers).

The array substrate AR is equipped with a gate line G extending along a first direction X, a source line S extending along a second direction Y orthogonally crossing the first direction X, a switching element SW connected with the gate line G and the source line S and a pixel electrode PE connected with the switching element SW, etc. Although the counter substrate CT is equipped with a counter electrode CE which faces each of the pixel electrodes PE through the liquid crystal layer LQ, for example, the array substrate AR may be equipped with the counter electrode CE.

In addition, although explanation is omitted about detailed structures of the display panel PNL, the display panel PNL is constituted so that modes which mainly use vertical electric field or oblique electric field, such as TN (Twisted Nematic) mode, OCB (Optically Compensated Bend) mode, and VA (Vertical Aligned) mode are applicable. Further, modes which mainly use lateral electric field, such as IPS (In-Plane Switching) mode and FFS (Fringe Field Switching) mode may be applicable by arranging the pixel electrode PE and the counter electrode CE on the array substrate AR.

A signal source to supply signals required for driving the display panels PNL, such as a driving IC chip 2 and a Flexible Printed Circuit (FPC) board 3, is arranged in a peripheral area PRP outside the active area ACT. In the illustrated example, the driving IC chip 2 and the FPC board 3 are mounted in a mounting portion MT of the array substrate AR which extends to outside beyond a substrate end CTE of the counter substrate CT.

The seal element SE is formed in the shape of an approximately rectangular frame along the end of the rectangular plate-like display panel PNL. In the seal element SE, the liquid crystal injecting mouth IL for injecting liquid crystal material is formed in an opposite side to the mounting portion MT sandwiching the active area ACT. The liquid crystal injecting mouth IL is formed so that both ends of the seal element SE are pulled out to the panel end PNE of the display panel PNL, respectively. The liquid crystal injecting mouth IL is sealed by a sealing material SC. The seal element SE is formed of heat curing type resin material, for example. The sealing material SC is formed of photosensitive resin materials, such as ultraviolet curing type resin, for example.

The array substrate AR is further equipped with a circumference wiring CN formed along the peripheral of the active area ACT. The circumference wiring CN is located in the peripheral area PRP, and formed along with three sides of the array substrate AR except the mounting portion MT. The circumference wiring CN is connected with the signal source (FPC board 3) in the mounting portion MT. Moreover, the circumference wiring CN is arranged along the seal element SE, and crosses the liquid crystal injecting mouth IL on the panel end PNE side.

The circumference wiring CN is a common wiring to which common potential is supplied, and connected with a counter electrode CE, etc., for example. Moreover, the circumference wiring CN is formed of the same wiring material, i.e., an electrically conductive material which blocks light, such as aluminum, titanium, molybdenum, and tungsten, as the gate line G, etc.

Figure 2:
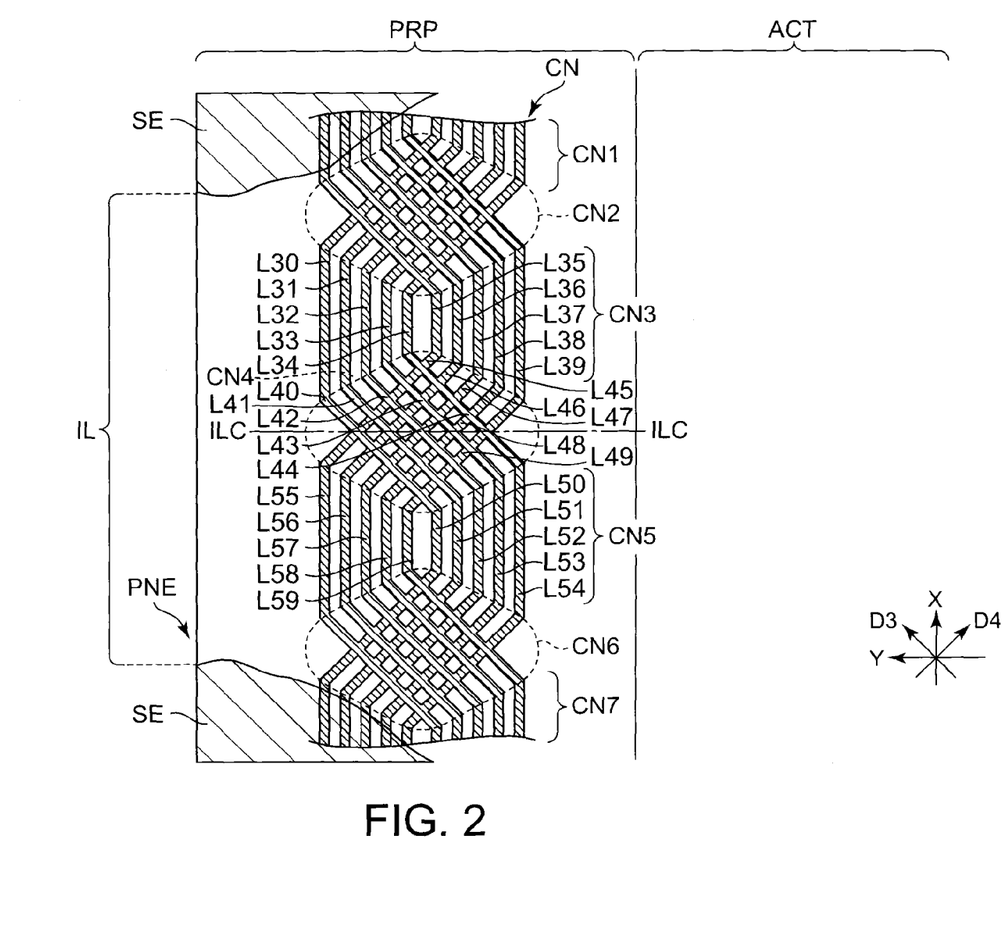
FIG. 2 is a plan view schematically showing a circumference wiring CN arranged in a liquid crystal injecting mouth IL in a display panel PNL shown in FIG. 1.

FIG. 2 is a plan view schematically showing the circumference wiring CN arranged in the liquid crystal injecting mouth IL in the display panel PNL shown in FIG. 1. In addition, illustration of the sealing material is omitted here.

The circumference wiring CN located in the liquid crystal injecting mouth IL extends along the first direction X. The circumference wiring CN includes a plurality of wiring portions CN1, CN3, CN5 and CN7 in the shape of a stripe and a plurality of wiring portions CN2, CN4 and CN6 in the shape of a grid in the liquid crystal injecting mouth IL. That is, the stripe-like wiring portions and the grid-like wiring portions are arranged by turns along the first direction X.

Hereinafter, the shape of the circumference wiring CN is explained in more detail. Here, three wiring portions CN3, CN4, and CN5 arranged in order along the first direction X are explained.

The wiring portions CN3 are equipped with ten straight line portions L30 to L39 extending in the first direction X, respectively. The straight line portions L30 to L39 are arranged in the second direction Y with equal interval therebetween, respectively. The straight line portion L30 which forms an edge of the circumference wiring CN among ten straight line portions is located on the panel end PNE side. On the other hand, the straight line portion L39 which forms an edge of the circumference wiring CN on the opposite side is located on a boundary side between the active area ACT and the peripheral area PRP. Both of the two straight line portions L34 and L35 are located in a central portion of the circumference wiring CN. The length of the straight line portions L30 and L39 in the first direction X is longer than the length of the straight line portions L34 and L35 in the first direction X. That is, the length of the straight line portions located on the edge side of the circumference wiring CN is longer than the length of the straight line portions located in the central portion of the circumference wiring CN. The straight line portions become shorter moving closer to the central portion of the circumference wiring CN. On the other hand, the straight line portions become longer moving closer to the edge side, conversely.

The wiring portion CN4 is located in the central portion ILC of the liquid crystal injecting mouth IL. The wiring portion CN4 is equipped with five straight line portions L40 to L44 which extend in a third direction D3 that crosses the first direction X and the second direction Y, and five straight line portions L45 to L49 which extend in a fourth direction D which intersects the first direction X, the second direction Y and the third direction D3. For example, the third direction D3 and the fourth direction D4 orthogonally cross mutually. The five straight line portions L40 to L44 and the five straight line portions L45 to L49 intersect perpendicularly mutually, and form the shape of a lattice. The straight line portion L40 is connected with the straight line portion L30, the straight line portion L41 is connected with the straight line portion L31, the straight line portion L42 is connected with the straight line portion L32, the straight line portion L43 is connected with the straight line portion L33, the straight line portion L44 is connected with the straight line portion L34, the straight line portion L45 is connected with the straight line portion L35, the straight line portion L46 is connected with the straight line portion L36, the straight line portion L47 is connected with the straight line portion L37, the straight line portion L48 is connected with the straight line portion L38, and the straight line portion L49 is connected with the straight line portion L39.

The wiring portion CN5 is constituted like the wiring portion CN3, and equipped with ten straight line portions L50 to L59 which extend in the first direction X, respectively. The straight line portions L50 to L59 are arranged in the second direction Y with equal interval therebetween, respectively. The straight line portion L50 is connected with the straight line portion L40, the straight line portion L51 is connected with the straight line portion L41, the straight line portion L52 is connected with the straight line portion L42, the straight line portion L53 is connected with the straight line portion L43, the straight line portion L54 is connected with the straight line portion L44, the straight line portion L55 is connected with the straight line portion L45, the straight line portion L56 is connected with the straight line portion L46, the straight line portion L57 is connected with the straight line portion L47, the straight line portion L58 is connected with the straight line portion L48, and the straight line portion L59 is connected with the straight line portion L49.

Although both ends of the seal element SE which forms the liquid crystal injecting mouth IL overlaps with the wiring portions CN1 and CN7, respectively, the seal element SE does not overlap with the wiring portions CN2 to CN6.

As an example, the width of the straight line portion L in the second direction Y is 50 µm, respectively.

Next, the structure of the circumference wiring CN is explained from another viewpoint.

Figure 3:
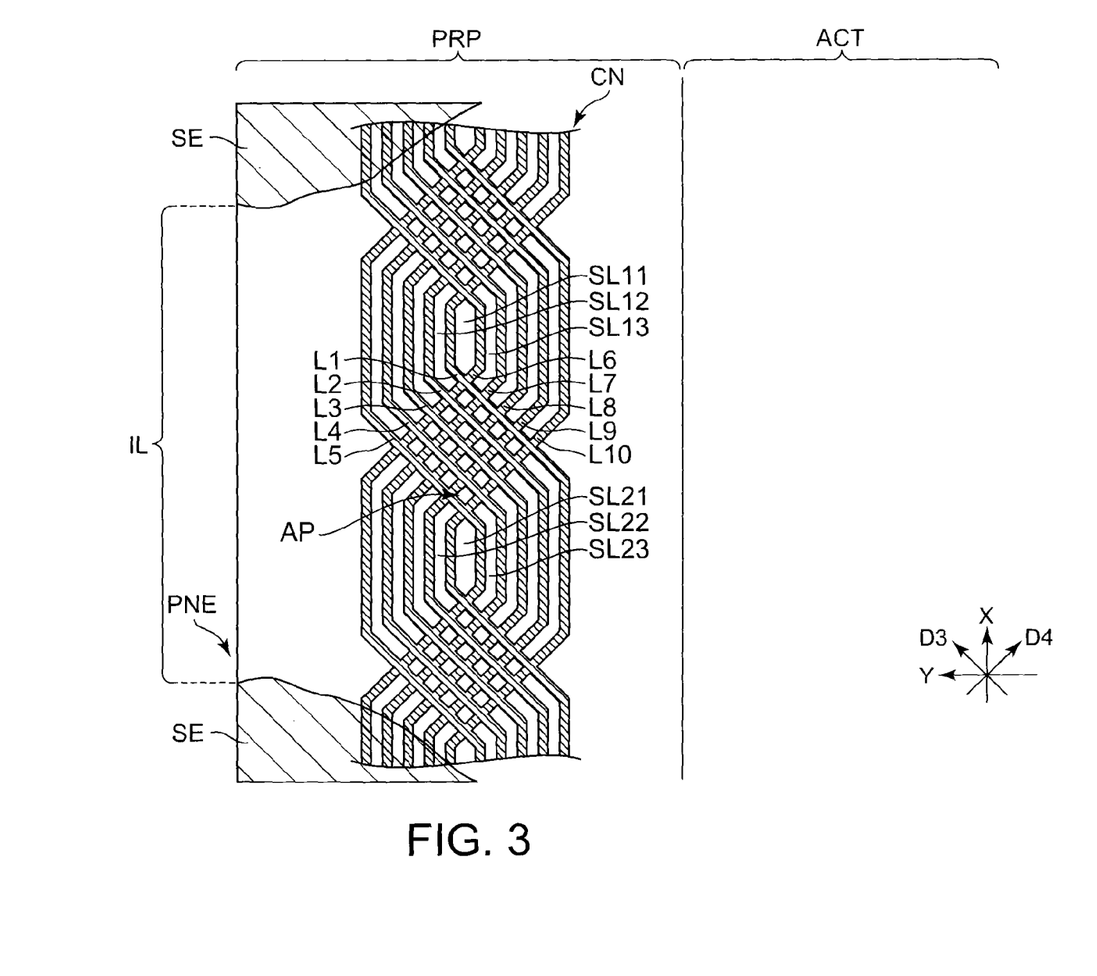
FIG. 3 is a plan view schematically showing the circumference wiring CN arranged in the liquid crystal injecting mouth IL in the display panel PNL shown in FIG. 1.

FIG. 3 is a plan view schematically showing the circumference wiring CN arranged in the liquid crystal injecting mouth IL in the display panel PNL shown in FIG. 1. In addition, illustration of the sealing material is omitted here.

The circumference wiring CN located in the liquid crystal injecting mouth IL and extending in the first direction X includes a plurality of slits SL extending in the first direction X, and a plurality of apertures AP arranged in the shape of a matrix. As an example, the slit SL11 is located in the central portion of the circumference wiring CN, and formed in the shape of a straight line extending in the first direction X. A pair of parenthetic type slits SL12 and slit SL13 facing each other are formed on the both sides which sandwich the slit SL11. That is, the shape of the slit SL12 is "[", and the shape of the slit SL13 is "]". The slit SL12 and slit SL13 include straight line portions, respectively extending in the first direction X. The respective straight line portions are in parallel to the slit SL11, and arranged apart from the slit SL11 with a regular interval therebetween. Slits formed in the shape of the parentheses are formed in the outside of the slit SL12 and slit SL13 and having the straight line portions extending in the first direction X.

On the other hand, the slit SL21 is located in the central portion of the circumference wiring CN, and formed in the shape of a straight line extending in the first direction X. The slit SL21 is located on the same straight line as the slit SL11. A pair parenthetic type slit SL22 and slit SL23 which face each other is also formed so as to sandwich the slit SL21.

The circumference wiring CN is equipped with oblique wirings L1 to L10 which obliquely cross the first direction X and the second direction Y between the slit SL11 and the slit SL21. Oblique wirings L1 to L5 extend along the third direction D3 that crosses the first direction X and the second direction Y. Oblique wirings L6 to L10 extend in the fourth direction D4 which intersects the first direction X, the second direction Y, and the third direction D3. Between the five oblique wirings L1 to L5 and the five oblique wirings L6 to L10, a plurality of apertures AP located arranged in the shape of a matrix are formed. Between the slit SL11 and the slit SL21, four apertures AP located in a line are formed in the first direction X. All of the sizes of the apertures AP are approximately the same. The respective lengths in the first direction X are shorter than the lengths of the slit SL11 and the slit SL21 in the first direction X.

As an example, the respective widths of the slit SL in the second direction Y are 50 µm.

Figure 4:
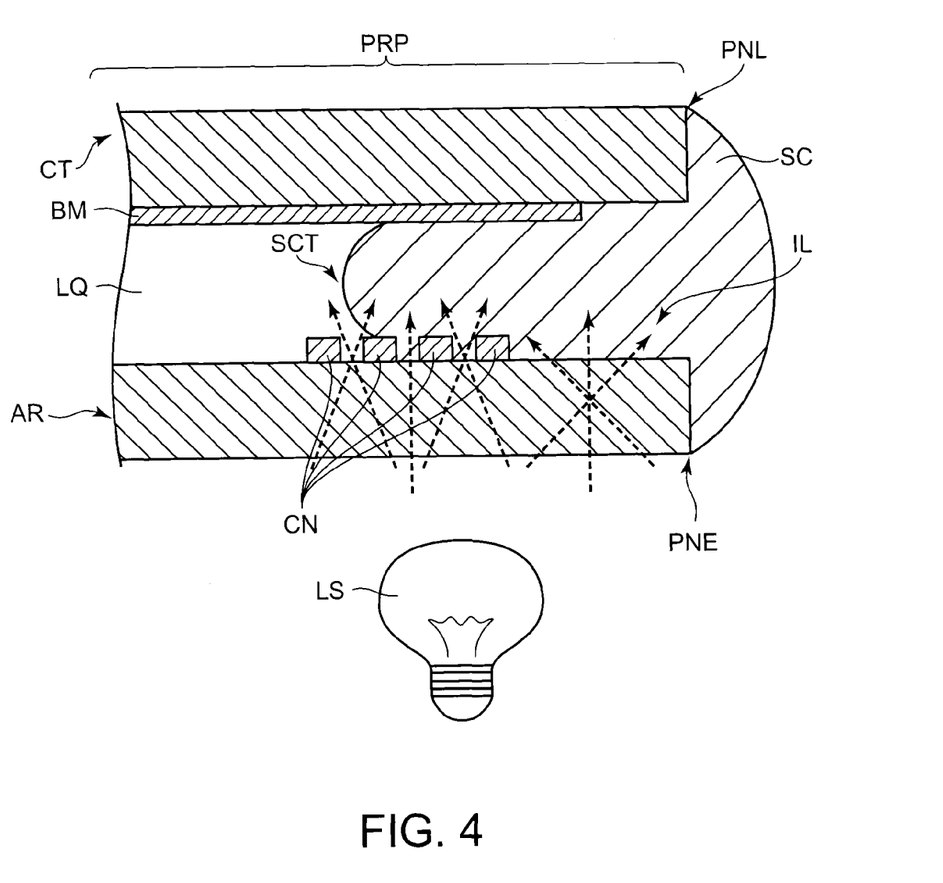
FIG. 4 is a cross-sectional view of the display panel PNL showing an exposure process to cure seal material SC.

FIG. 4 is a cross-sectional view of the display panel PNL showing an exposure process to cure the seal material. In addition, only structure required for the explanation in the liquid crystal injecting mouth IL is illustrated by simplifying here.

In the display panel PNL holding the liquid crystal layer LQ between the array substrate AR and the counter substrate CT, the array substrate AR includes the circumference wiring CN in the peripheral area PRP. The counter substrate CT includes a shielding layer BM in the peripheral area PRP. Although the array substrate AR and the counter substrate CT are formed using transparent insulating substrates, such as a glass substrate and a resin substrate, since the shielding layer BM is arranged on the counter substrate CT side, the optical irradiation for curing the sealing material SC is performed from the array substrate AR side. That is, a light source LS for curing the sealing material SC is located on the back side of the array substrate AR. A light source LS emits the light with wavelength necessary to cure the sealing material SC which is formed of photosensitive resin material. For example, when the sealing material SC is formed of ultraviolet curing type resin material, the light source LS emits the light including an ultraviolet wavelength.

The illustrated example shows a state where the liquid crystal injecting mouth IL is filled up with the sealing material SC. The sealing material SC is filled up toward the inner side of the display panel PNL from the panel end PNE. Since there is almost no component which interrupts light on the panel end PNE side in the array substrate AR, the light emitted from the light source LS fully reaches to the sealing material SC. On the inner side (side in contact with the liquid crystal layer LQ) of the display panel PNL, since the circumference wiring CN is arranged on the array substrate AR, a portion of the emitted light from the light source LS is interrupted. However, the emitted light which penetrates a crevice between the circumference wirings CN (slit SL and the aperture AP as mentioned above) reaches to the sealing material SC. Moreover, since the emitted light from the light source LS has divergent characteristics, the light penetrating the crevice between the circumference wirings CN reaches to substantially whole of the sealing material SC by sneak of light. For this reason, it becomes possible to fully cure the whole sealing material SC including a tip portion SCT in contact with the liquid crystal layer LQ.

In recent years, demand for a miniaturization and a large screen of the liquid crystal display device is rising, and the width of the frame surrounding the active area ACT which displays images tends to become narrow. On the other hand, the number of the models which need the circumference wiring CN around the active area ACT for the measure against static electricity, etc. is increasing. In the narrow frame display panel PNL, it is difficult to secure a wide area between the active area ACT and the seal element SE. Accordingly, the circumference wiring CN is formed along the seal element SE. For this reason, the circumference wiring CN crosses the liquid crystal injecting mouth IL formed in the seal element SE. In order to cure the sealing material SC which is formed of photosensitive resin material with which the liquid crystal injecting mouth IL is filled up, it is necessary to carry out optical irradiation toward the sealing material SC. However, since the circumference wiring CN is formed of the same wiring material as the gate line, etc., the circumference wiring CN interrupts the light irradiated toward the sealing material SC. For this reason, when a portion of the sealing material SC is uncured, and the sealing material SC contacts with the liquid crystal layer LQ, the liquid crystal layer LQ is easy to be polluted with the impurities contained in the sealing material SC.

Then, this embodiment supplies the circumference wiring CN capable to control uncured sealing material SC. In the circumference wiring CN, not only crevice (slit and aperture) but the pattern in which the emitted light from the light source LS reaches to the sealing material SC easily, i.e., emitted light reaches to substantially whole of the sealing material SC by sneak of the light penetrating the crevice between the circumference wirings CN, is provided further. More specifically, the circumference wiring CN is thinned so that the width is set to about 50 μm in an extent that the wiring resistance does not increase. Furthermore, the respective pitches (or slit width) are set to approximately 50 μm narrow pitch. Moreover, the straight line portion extending in one direction among the circumference wirings CN is shortened, and connected with the straight line portion extending in the oblique direction. Moreover, the circumference wiring CN includes a portion formed in the shape of a lattice (or the shape in a mesh)

In the thinned straight line portion, the emitted light from the light source LS easily reaches to the sealing material SC overlapping with the thinned straight line portion because the light penetrating the crevice (slit) between the thinned straight line portions sneaks. Moreover, in the portion formed in the shape of a lattice, the emitted light from the light source LS easily reaches to the sealing material SC overlapping with the matrix portion because the light penetrating the crevice (slit) between the thinned straight line portions sneaks.

Thereby, the emitted light reaches to substantially the whole sealing material SC, and it becomes possible to control the uncured sealing material SC. Therefore, even if the sealing material SC and the liquid crystal layer LQ contact, the pollution of the impurities from the sealing material SC to the liquid crystal layer LQ can be controlled, and it becomes possible to control degradation of the display grace resulting from the contamination of the liquid crystal layer LQ.

Figure 5:
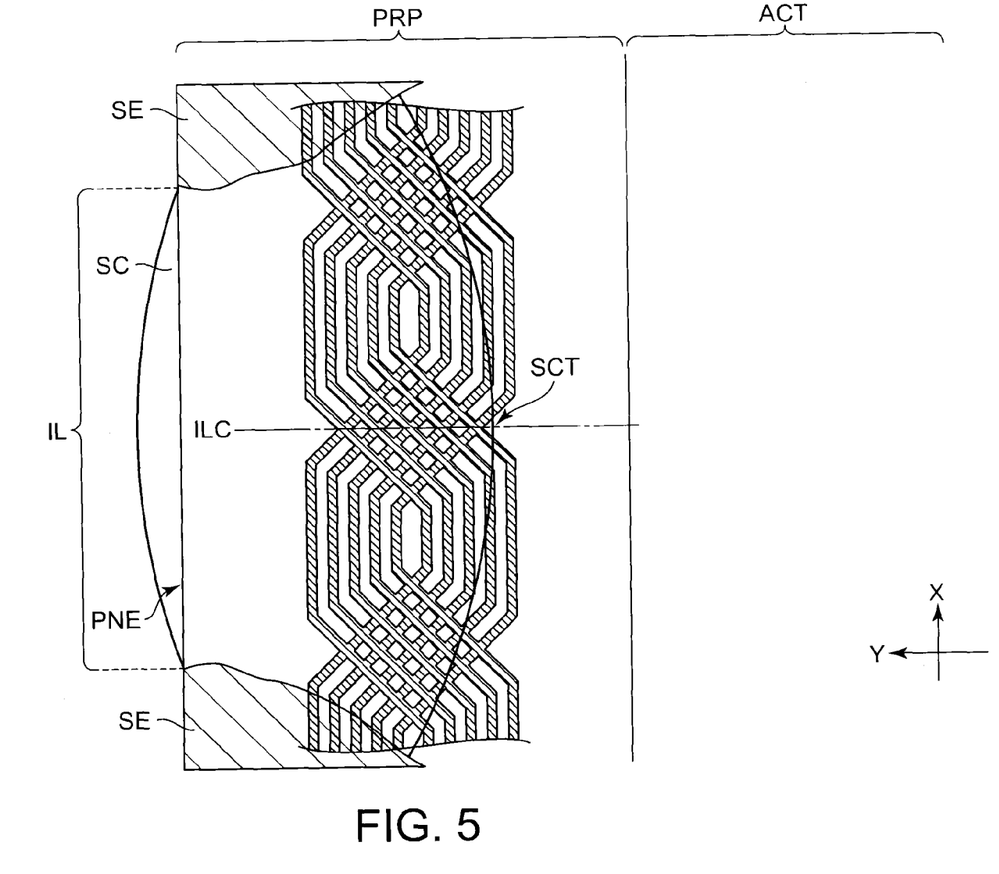
FIG. 5 is a plan view schematically showing sealing material SC sealed in the liquid crystal injecting mouth IL.

FIG. 5 is a plan view schematically showing the sealing material SC sealed in the liquid crystal injecting mouth IL.

In the liquid crystal injecting mouth IL, the amount of the sealing material SC entering into the active area ACT is one of the important control items in the display panel PNL. That is, it is necessary to check if the tip portion SCT of the sealing material SC stays in the peripheral area PRP, and does not invade to the active area ACT. When checking the entering amount to the active area, since the counter substrate CT is equipped with the shield layer BM as above-mentioned, it is necessary to measure the position of the tip portion SCT from the back side of the array substrate AR.

In this embodiment, since the circumference wiring CN is thinned and the straight line portion is shortened as above-mentioned, it becomes possible to easily measure the position of the tip portion SCT from the crevice between the circumference wirings CN. Especially, in the circumference of the central portion ILC of the liquid crystal injecting mouth IL, the sealing material SC easily enters and approaches to the active area ACT. However, in the central portion ILC, the wiring portion in the shape of a lattice in which the oblique wirings cross among the circumference wirings CN is located, it becomes possible to easily check the position of the tip portion SCT as compared with the case where the parallel straight line portion in the first direction X is located in the central portion ILC. Therefore, it becomes possible to control the amount of the sealing material SC entering into the active area with sufficient accuracy.

As explained above, according to this embodiment, the liquid crystal display device which can control degradation of display grace can be supplied.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device comprising:
a first substrate including a circumference wiring along with a periphery of an active area which displays images;
a second substrate arranged facing the first substrate;
a seal element arranged surrounding the active area and forming a liquid crystal injecting mouth, the seal element attaching the first substrate and the second substrate while a cell gap is formed between the first substrate and the second substrate;
a liquid crystal layer held in the cell gap surrounded with the seal element; and
a seal material to seal the liquid crystal injecting mouth; wherein
the circumference wiring is located in the liquid crystal injecting mouth and extends in a first direction, and includes,
a first wiring portion formed of a plurality of straight line portions having a first straight line portion and a second straight line portion extending in the first direction and arranged in a second direction orthogonally crossing the first direction,
a second wiring portion formed of a plurality of straight line portions having a third straight line portion extending in a third direction crossing the first and second directions and connected with the first straight line portion, and a fourth straight line portion extending in a fourth direction crossing the first, second and third directions and connected with the second straight line portion,
a third wiring portion formed of a plurality of straight line portions having a fifth straight line portion extending in the first direction and connected with the third straight line portion, and a sixth straight line portion extending in the first direction and connected with the fourth straight line portion, the fifth straight line portion and the sixth straight line portion being arranged in the second direction,
the second wiring portion is formed in a shape of a grid at a place where the third straight line portion and the fourth straight line portion cross each other, and
the first wiring portion, the second wiring portion, and the third wiring portion are formed integrally.

2. The liquid crystal display device according to claim 1, wherein in the second wiring portion, a place where the third straight line portion and the fourth straight line portion cross each other is arranged substantially in the center of the liquid crystal injecting mouth.

3. The liquid crystal display device according to claim 1, wherein the respective straight line portions of the first and third wiring portions are arranged with an equal interval therebetween, respectively, in the second direction.

4. The liquid crystal display device according to claim 1, wherein the length of respective straight line portions of the first and third wiring portions along the first direction is longer on an edge side than in a central portion.

5. The liquid crystal display device according to claim 1, wherein a space between respective straight line portions of each of the first wiring portion, the second wiring portion, and the third wiring portion is substantially the same as a line width of the respective straight line portions.

6. The liquid crystal display device according to claim 1, wherein the straight line portions of each of the first wiring portion and the third wiring portion are formed in shapes of stripes, respectively.

7. A liquid crystal display device comprising:
- a first substrate including a circumference wiring along with a periphery of an active area which displays images;
- a second substrate arranged facing the first substrate;
- a seal element arranged surrounding the active area and forming a liquid crystal injecting mouth, the seal element attaching the first substrate and the second substrate while a cell gap is formed between the first substrate and the second substrate;
- a liquid crystal layer held in the cell gap surrounded with the seal element; and
- a seal material to seal the liquid crystal injecting mouth;
- wherein the circumference wiring located in the liquid crystal injecting mouth and extending in a first direction includes a first slit extending in the first direction, and a pair of second slits in a bracket shape facing each other sandwiching the first slit.

8. The liquid crystal display device according to claim 7, wherein the circumference wiring further includes a third slit extending in the first direction, the first slit and the third slit being arranged in the first direction, and an oblique wiring line arranged between the first slit and the third slit obliquely crossing the first direction.

9. The liquid crystal display device according to claim 8, wherein the circumference wiring includes a plurality of apertures formed between the first slit and the third slit, and a length of the aperture in the first direction is less than a length of each of the first and third slits.

10. The liquid crystal display device according to claim 9, wherein the apertures are arranged in a matrix shape.

11. The liquid crystal display device according to claim 8, wherein the circumference wiring is formed as a thin wiring having a width substantially the same as a width of each of the first, the second and the third slits.

12. The liquid crystal display device according to claim 8, wherein each of the first slit and the third slit is hexagonal.

13. A liquid crystal display device comprising:
- a first substrate including a circumference wiring along with a periphery of an active area which displays images;
- a second substrate arranged facing the first substrate;
- a seal element arranged surrounding the active area and forming a liquid crystal injecting mouth, the seal element attaching the first substrate and the second substrate while a cell gap is formed between the first substrate and the second substrate;
- a mounting portion arranged on an end portion of the first substrate beyond the second substrate for mounting a driving circuit;
- a liquid crystal layer held in the cell gap surrounded with the seal element; and
- a seal material to seal the liquid crystal injecting mouth;
- wherein
- the liquid crystal injecting mouth is formed in an opposite end portion to the mounting portion of the first substrate,
- the circumference wiring is located in the liquid crystal injecting mouth and extends in a first direction, and includes,
- a first wiring portion formed of a plurality of straight line portions having a first straight line portion and a second straight line portion extending in the first direction and arranged in a second direction orthogonally crossing the first direction,
- a second wiring portion formed of a plurality of straight line portions having a third straight line portion extending in a third direction crossing the first and second directions and connected with the first straight portion, and a fourth straight line portion extending in a fourth direction crossing the first and third directions and connected with the second straight line portion,
- a third wiring portion formed of a plurality of straight line portions having a fifth straight line portion extending in the first direction and connected with the third straight line portion, and a sixth straight line portion extending in the first direction and connected with the fourth straight line portion, the fifth straight line portion and the sixth straight line portion being arranged in the second direction,
- the respective straight line portions of the first and third wiring portions are arranged with an equal interval therebetween, respectively, in the second direction,
- the length of respective straight line portions of the first and third wiring portions along the first direction is longer on an edge side than in a central portion,
- the second wiring portion is formed in a shape of a grid at a place where the third straight line portion and the fourth straight line portion cross each other, and
- the place where the third straight line portion and the fourth straight line portion cross each other is arranged substantially in the center of the liquid crystal injecting mouth.

14. The liquid crystal display device according to claim 13, wherein
the seal element is formed of heat curing type resin material, and the sealing material is formed of photosensitive resin materials.

15. The liquid crystal display device according to claim 13, wherein
the circumference wiring is a common wiring to which common potential is supplied, and formed of an electrically conductive material which blocks light.

16. The liquid crystal display device according to claim 15, wherein
the circumference wiring is formed of one electric conductive material selected from the group consisting of aluminum, titanium, molybdenum, and tungsten.

17. The liquid crystal display device according to claim 13, wherein the straight line portions of each of the first wiring portion and the third wiring portion are formed in shapes of stripes, respectively.

* * * * *